United States Patent [19]

Ingalsbe

[11] Patent Number: 4,703,497
[45] Date of Patent: Oct. 27, 1987

[54] FOUR PAIR CABLE TEST SET

[75] Inventor: David L. Ingalsbe, Norfolk, Nebr.

[73] Assignee: Independent Technologies, Inc., S. St. Paul, Minn.

[21] Appl. No.: 846,347

[22] Filed: Mar. 31, 1986

[51] Int. Cl.$^4$ .............................................. H04B 3/46
[52] U.S. Cl. ......................................... 379/22; 324/66
[58] Field of Search .................. 379/21, 5, 22, 23, 25, 379/26, 27; 324/66

[56] References Cited

U.S. PATENT DOCUMENTS

4,575,588  3/1986  Vande Ugver ...................... 379/22
4,596,904  6/1986  Messenger ............................ 379/22

Primary Examiner—Stafford D. Schreyer
Attorney, Agent, or Firm—Anthony G. Eggink

[57] ABSTRACT

The methods and apparatus for checking the operability of eight conductors simultaneously including four pair cable which may be connected to any of several types of electronic or electromechanical telephone systems. The apparatus is connected directly to the cable by utilizing a modular four pair jack and plug. Said apparatus may be used by connecting directly to a phone system and observing LED illuminations configured by operating any one of four switches individually or simultaneously. In addition, pre-service wiring can be tested by using shorting plugs or LED shorting plugs on the opposite end of the cable that is connected to the test apparatus. The tests and methods will indicate opens, shorts, polarity reversals and wire transposition by LED illuminations and warble tone which is generated out over the cable pair. This test apparatus is compatible with most existing telephone systems, from the oldest key system to the latest electronic PBX switches. The device is self powered by a nine volt battery. All of the components are disposed within a hand held, pocket sized case.

12 Claims, 14 Drawing Figures

FOUR PAIR CABLE TEST SET

FIELD OF INVENTION

The present invention relates to the testing of four pair cable conductors and, in particular, to a cabling arrangement which includes, but is not limited to: interconnect terminals, connecting blocks, and subscriber telecommunication equipment.

BACKGROUND OF THE PRIOR ART

Telephone companies are required to provide customers with what the industry calls "access". Put quite simply, "access" is a type of protected method of terminating the telephone company's line or lines on or at a customer's premises. The method or methods utilized to interconnect these lines within the confines of the customer's premises can create a jungle of interconnect wiring.

Since the introduction of data terminals, and specifically personal computers; the need for additional cable pairs has resulted in the universal acceptance of four pair cable. This use of four pair cable satisfies conductor requirements for both the telecommunication electronic systems and the data terminal systems.

Due to the aforementioned interconnect proliferation of four pair cable, there has also arisen a need to be able to accurately test the conductor terminations of said cables. Especially critical are the conductors which carry the data-stream.

Presently, interconnect personnel test the various conductor paths (throughout the systems) by simple continuity tests which may be performed by using the analog or digital multimeter. These methods, however, are inadequate at best. Conventional continuity tests are performed on individual conductors on a "one at a time" basis. In other words, the test person uses a multimeter or a single-pair tone set equipped with a visual indicator. One end of a conductor-pair is shorted by one person and a second person waits for an indication of continuity—either a visual or audible tone.

The result of this type of methodology wastes enormous amounts of time for craftspersons assigned to these jobs. Furthermore, single application continuity tests do not lend themselves to any particular established routines. Additionally, available types of devices and techniques usually require two craftspersons and two meters which render the tasks even more arduous.

Various test set vendors offer different types of continuity devices which check individual conductor paths. However, there is a conspicuous absence of test devices which test the common four-pair cable as an operating entity. Some test equipment will measure digital or analog conditions of the conductors, but once again, they do not verify the simple connecting integrity of the various interconnected systems.

SUMMARY OF THE INVENTION

The primary object of this invention is to provide telecommunication installers and testers with a versatile, compact, economical and easy to use test device with which to test four pair telecommunication interconnect cable. It is also the inventors objective to accomplish this goal with an ingenious device that will test as many conditions as possible and still remain compact and portable.

The present invention provides an improved device and method which allows the previously mentioned tests to be performed by one craftsperson. The present invention utilizes several cord configurations and methods which replace several tools previously used to perform many of the aforementioned tasks. With our invention a craftsperson establishes the necessary connections and then is able to perform several tests without further rearrangement of the test equipment. First, the pairs are tested for a line status indication or presence of voltage; (four pairs simultaneously). Bi-directional LEDs advise the user if an active tip and ring are present on the cable pair and if the polarity is proper, (green indication); reversed, (red indication); if A.C. voltage is present, (amber indication); and if the line is unused, (no indication).

Next the technician may desire to check the same four pairs of a cable being tested for trouble that may have been previously indicated. This is accomplished by switching the function switch on the invention to continuity and operating each pair switch to the "C" position while observing the associated LED. A shorted cable pair would illuminate the associated LED green. Further continuity testing is accomplished with the invention connected as aforementioned and all the pair switches, as well as the function switch, in the continuity position, and installing an LED equipped shorting plug on the cable pair under test at the next test point. Cable pairs which are functional and properly terminated will cause a green indication on both the hand held test set end as well as on the LED equipped shorting plug. A functional cable pair that has a reversal in termination would indicate red on the shorting plug to identify the reversal and green on the hand held test set to display continuity. An open cable pair would be indicated by no illumination on either end. Transposed four pair cables would be indicated by operating the hand held test set switches with the shorting plug on the far end in place. When a transposition occurs, more than one LED would illuminate when a single switch is operated. Hence, an easier and more efficient method of testing is provided as a result of this invention.

Trouble locating and cable identification can also be expedited. The technician can use the invention to locate faults after they have been identified by employing the tone function of this invention. This is accomplished by merely operating the function switch and pair switch to the tone position. Four pairs of cable may be toned simultanuously without degrading the tone quality emitted from the invention. A warble tone design is used to avoid confusion with data circuits or alarm circuits which may be operating in the same cable runs.

Another unique feature of this invention is a control button associated with pair two of the invention. The control button is designed to aid a technician in trouble shooting 1A type key equipment. The control button permits the technician the flexibility of testing cable without prior equipment removal and, in addition, testing any pair in the terminated cable. When the invention is connected to a working system, operation of the control button exercises the equipment end, causing LED #3 to illuminate if proper operation occurs. The LED indications on a working system with a vacant line would be: LED #1 Green, LED #2 Red, LED #3 Dark, and LED #4 Green. After operating the control button, LED #1, #2, and #4 remain the same, but LED #3 would illuminate red if the system is operating properly. This feature allows a technician to test 1A type key features from any termination point within said system.

BRIEF DESCRIPTION OF THE DRAWINGS

In order to more clearly define the invention, the following descriptions explain the figures.

DETAILED DESCRIPTION OF THE PREFERRED EMBODIMENT

The description of the preferred embodiment of the invention will be described herein with reference to the schematic, several views and various methods of usage. The same reference numbers are used for the same component parts in the various drawing figures.

The various illustrations described herein are not intended to be an exclusive description of illustrated forms of applications. It is the inventor's intention to best describe the most useful applications to those who are skilled in the art.

Figure 1:
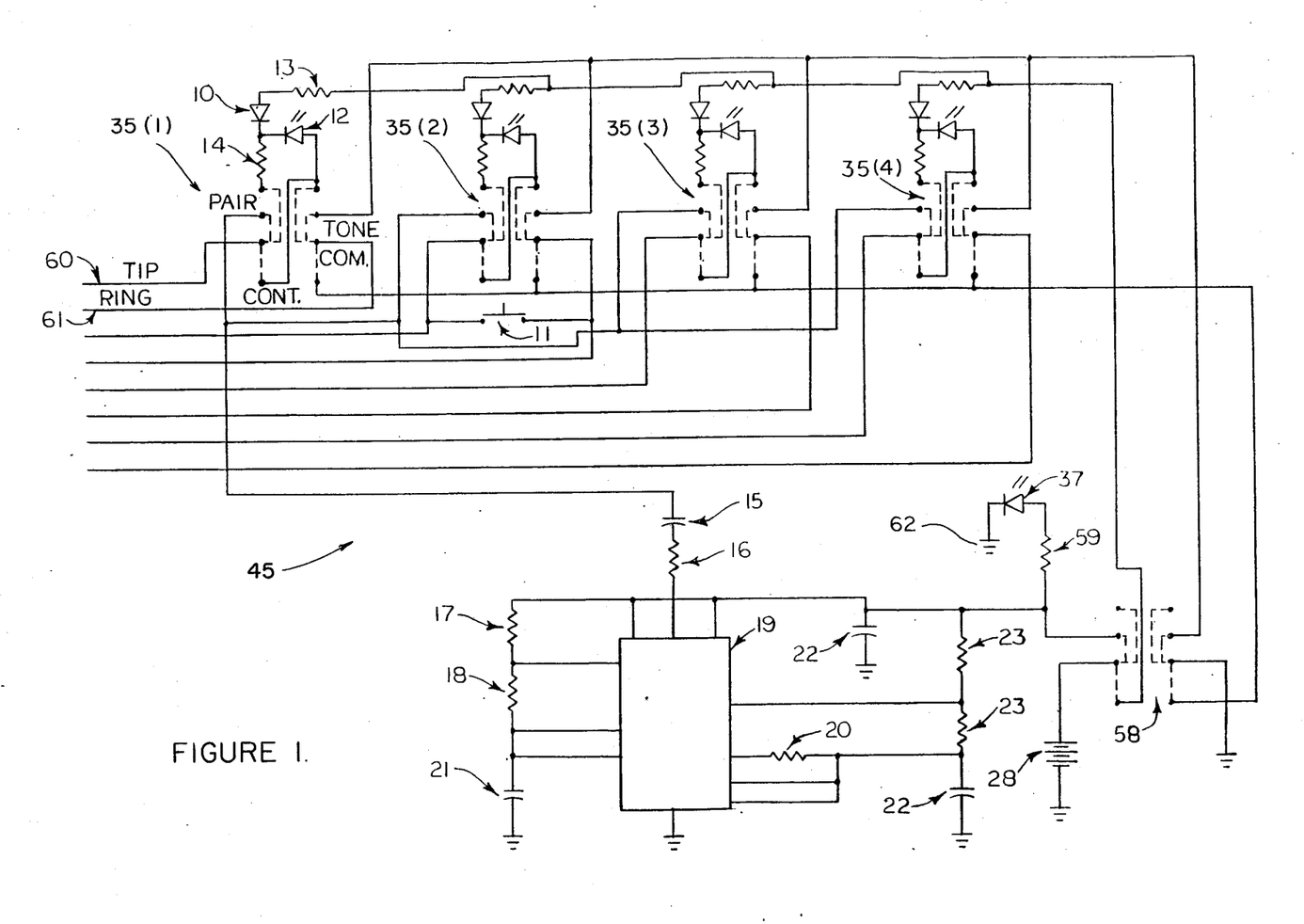
FIG. 1 is a schematic circuit diagram of the preferred embodiment, according to the parameters of the present invention.
Figure 7:
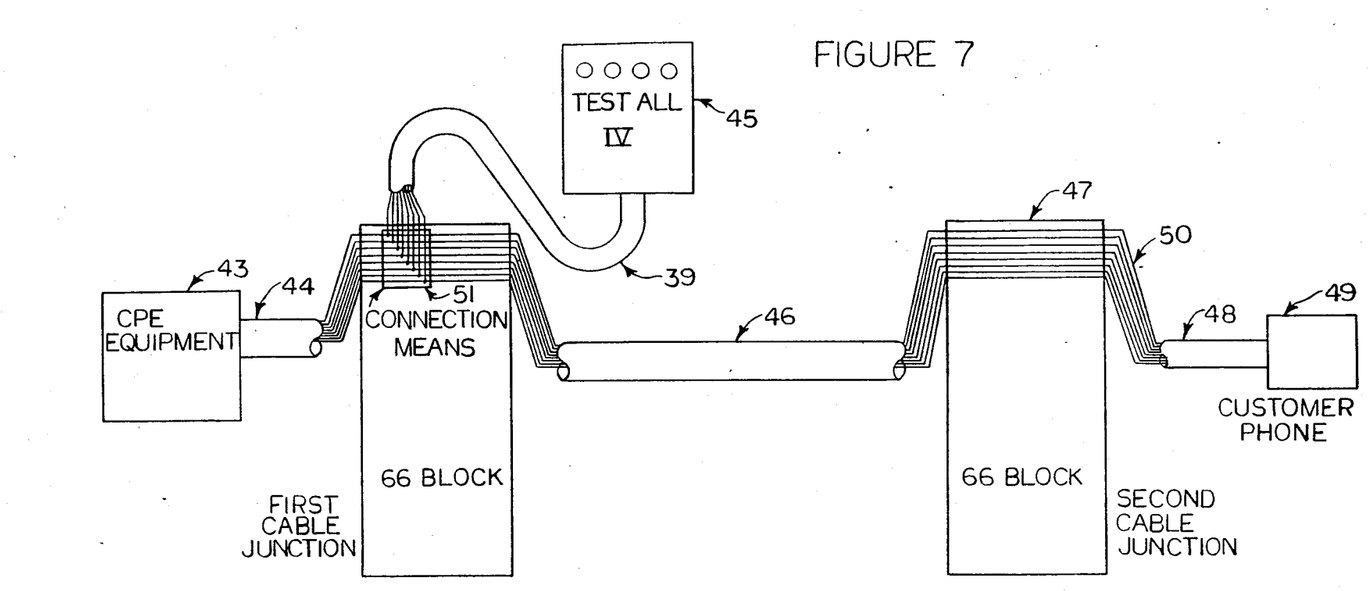
FIG. 7 and FIG. 8 are pictorial representations of the embodiment when operating in the "pair" mode to test C.P.E. and determine individual line status.
Figure 8:
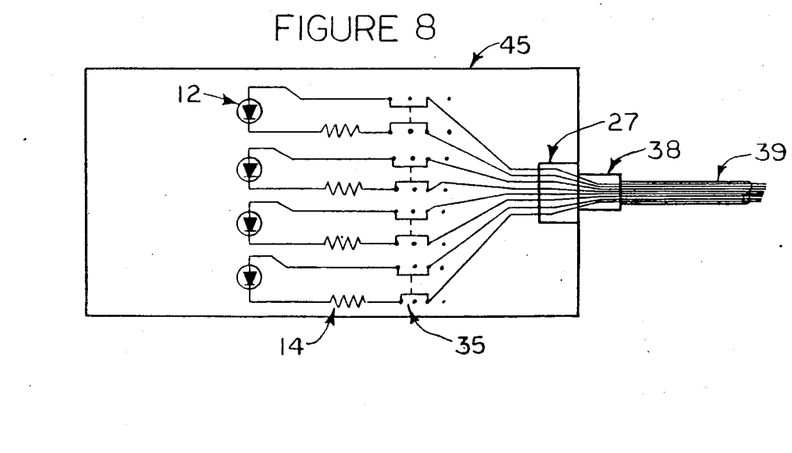
Figure 9:
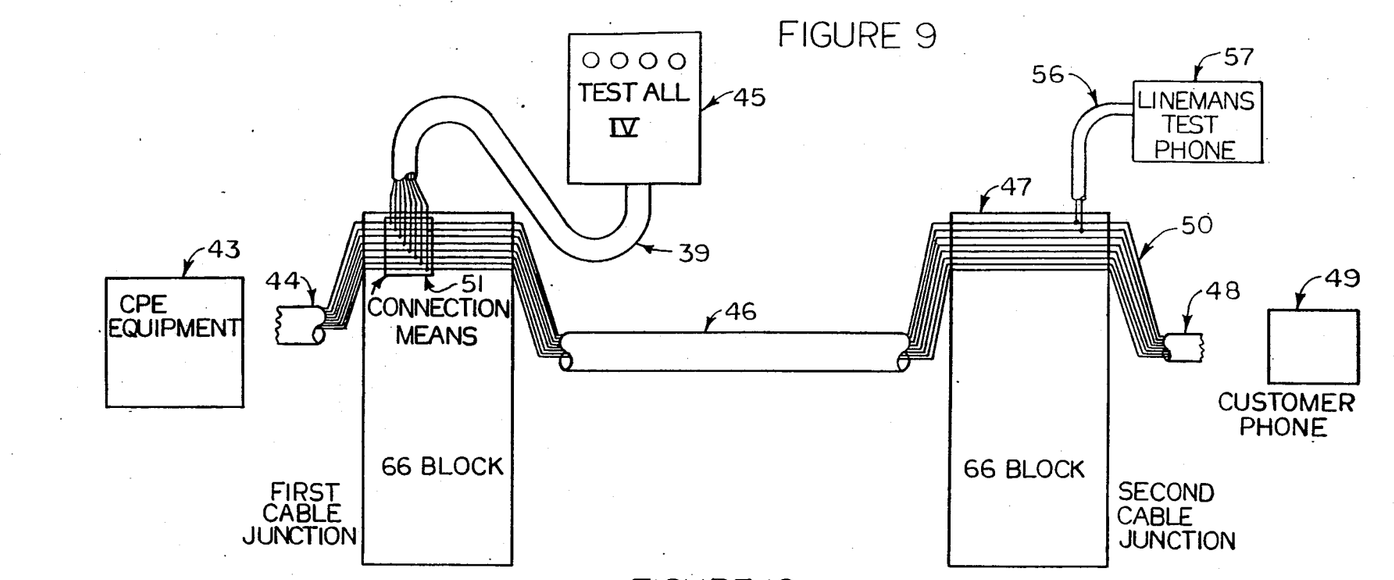
FIG. 9 and FIG. 10 are pictorial representations of the embodiment when operating in the "tone" mode to send warble tone over cable pairs between 66 type block interconnections.
Figure 10:
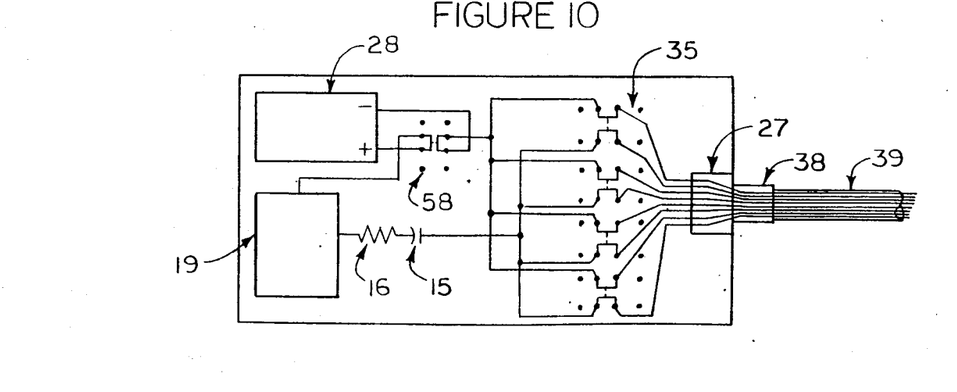

Referring now to the figures and in particular to FIG. 1, there is illustrated a preferred embodiment 45 of a four pair test device circuit arrangement which may be connected across any one or all of the four pairs, (individually or all simultaneously), of conductors, 60 and 61. Similarily, FIGS. 7, 8, and 9 illustrate the same conductors incorporating said embodiment 45.

In FIG. 1 the tip conductor 60 of each pair is connected to one side (common) of each of four double pole three position slide switches 35, which are designated "P.T.C.". Also, the ring conductor 61 of each pair is connected to the opposite side of said switches 35 and is also connected to common. A fifth slide switch 58 is designated "function" and further controls the pair switching modes of said conductors 60 and 61.

When both switching means 35 and 58 are operated to the position designated "pair", the tip 60 of the pair is provided a current path through switching means 35 and in series with load resistor 14 and tri-state, bi-directional LED 12, back through switching means 35 to the common pole of switching means 35 to the ring side and out on ring conductor 61 to a terminating device such as a PBX, key system, or a voltage source. FIG. 8 specifically illustrates the "pair" current path through the embodiment 45.

Figure 12:
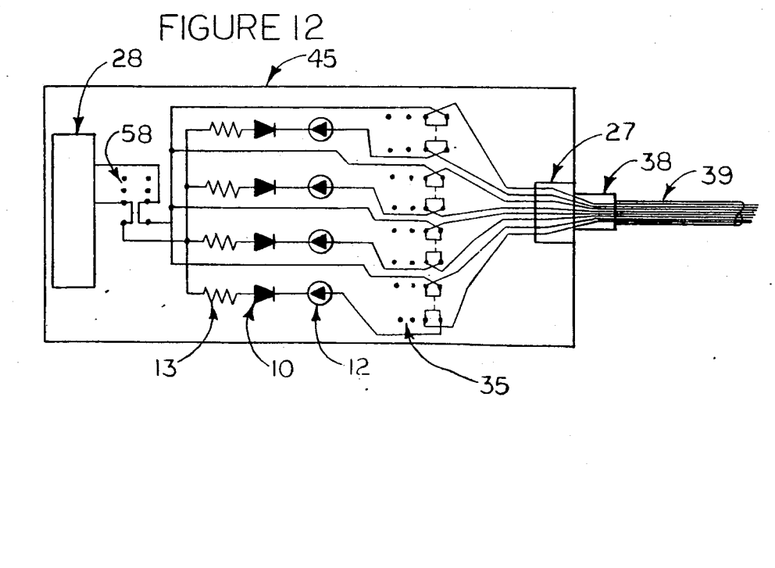

When both switching means 35 and 58 are operated to the position designated "cont", the tip 60 of the pair is provided a current path through switching means 35 and in series with LED 12, isolation diode 10, load resistor 13, through switching means 58 to the positive terminal of battery source 28. The ring 61 of of said pair is provided a current path through switching means 35 and 58 to the negative terminal of battery source 28. It will be obvious to those knowledgeable in the art, that by the use of a shorting device across tip 60 and ring 61 at any point of termination of said tip and ring pair; said short will illuminate the related "pair" LED, (assuming their is a continuous metallic path), which is the intent of the inventor. FIG. 12 specifically illustrates the "cont" current path through the embodiment 45.

When both switching means 35 and 58 are operated to the position designated "tone", the tip 60 of the pair is provided an audible path through switching means 35 in series with capacitance 15, and line resistor 16 to tone source 19. The ring 61 of said pair is provided a grounding path through switching means 35 and 58 to the common negative grounding node 62. The aforementioned tone path is referenced to ground in said method so as to be more resistant to tone crossover which is a common problem familiar to those knowledgeable in the art. Also, FIG. 1 tone source 19 and related components 15, 18, 20, 21, 22, and 23 are associated with aforementioned tone source, which is a circuit configuration well known to those skilled in the art, and said related information is readily available. In addition, said tone source can be reconfigured for different types of tone, such as the "warble" tone which is the inventor's choice.

The control button or switch 11, as shown in FIG. 1, permits the technician the flexibility of testing cable without prior equipment removal and, in addition, testing any pair in the terminated cable. When the invention is connected to a working system, operation of the control button 11 exercises the equipment end, causing LED 35 (#3) to illuminate if proper operation occurs. The LED 35 indications on a working system with a vacant line would be: LED 35 (#1) Green, LED 35 (#2) Red, LED 35 (#3) Dark, and LED 35 (#4) Green. After operating the control button 11, LED 35 (#1), (#2), and (#4) remain the same, but LED 35 (#3) would illuminate red if the system is operating properly. This feature allows a technician to test 1A type key features from any termination point within the system.

Figure 2:
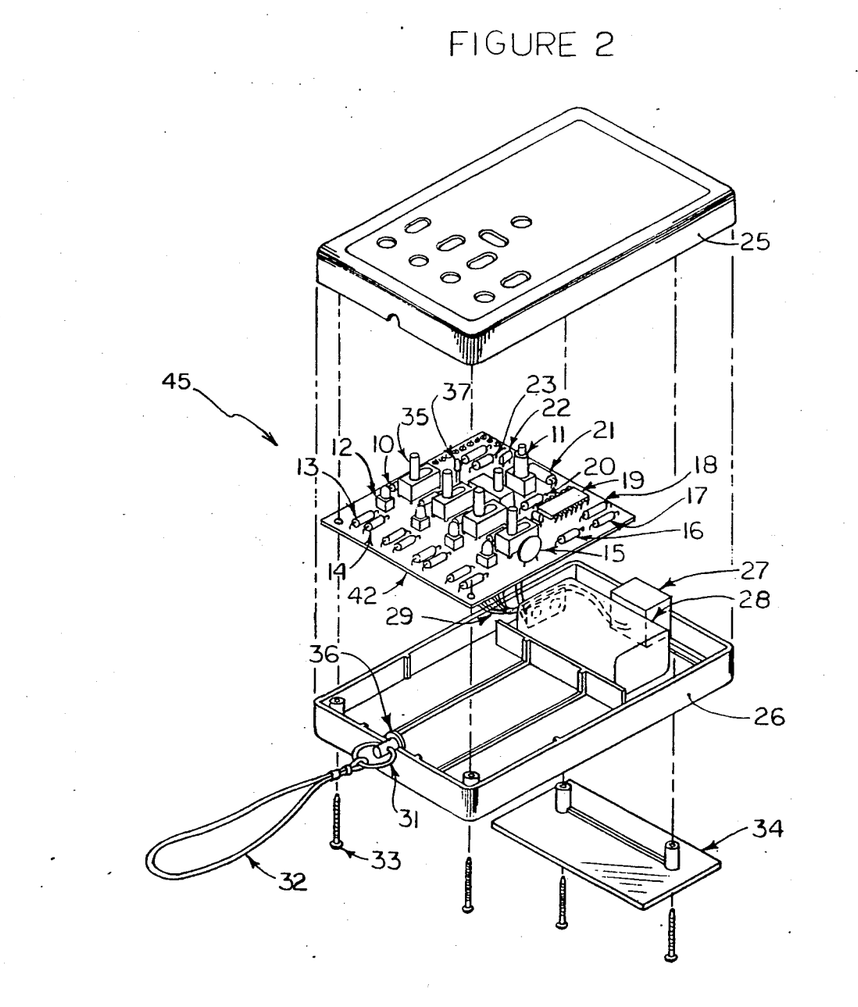
FIG. 2 is an exploded view of the electrical components and the self-contained case which encloses the preferred embodiment.

FIG. 2 is the exploded view of the preferred embodiment 45 therein, housed in an enclosure consisting of an upper front one half 25 and a lower back one half 26, said halves being held together by four ¾", self tapping, number two screws 33. The aforementioned lower one half 26 has a removable battery compartment plate 34 affixed and held by two of said screws 33. Also, lower half 26 has a modular jack connecting means 27 which will accomodate a modular eight position plug which is well known in the industry to those knowledgeable in the art. Carrying strap 32 is provided for convenience of use when the invention is used in the sixty-six block arrangement illustrated in FIGS. 7, 9, and 11. Said strap is affixed to the lower one half enclosure 26 by retaining ring 36.

Figure 3:
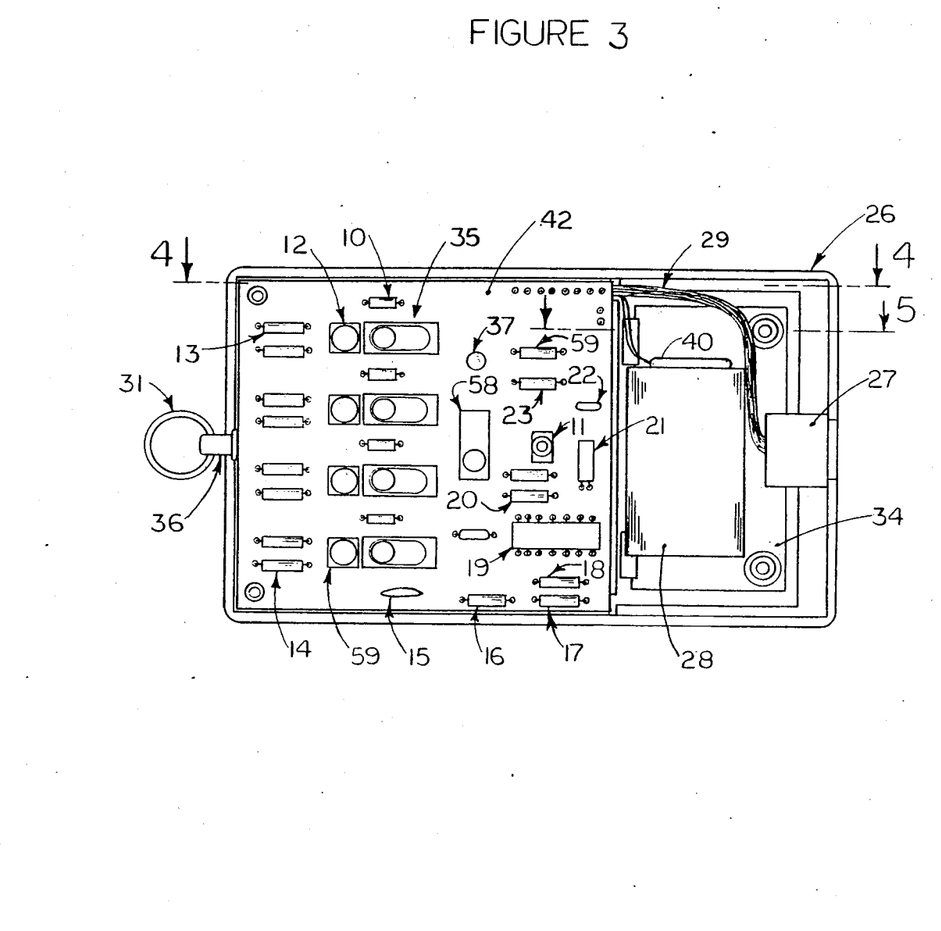
FIG. 3 is a plan view of the component side of the preferred embodiment resting in the lower one half of the enclosure.
Figure 4:
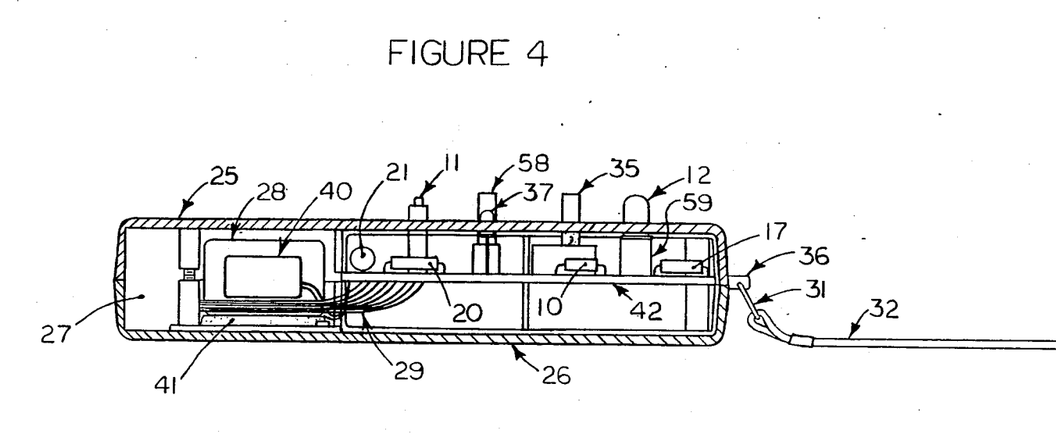
FIG. 4 and FIG. 5 are cross section views of the preferred embodiment mounted in the enclosure.
Figure 5:
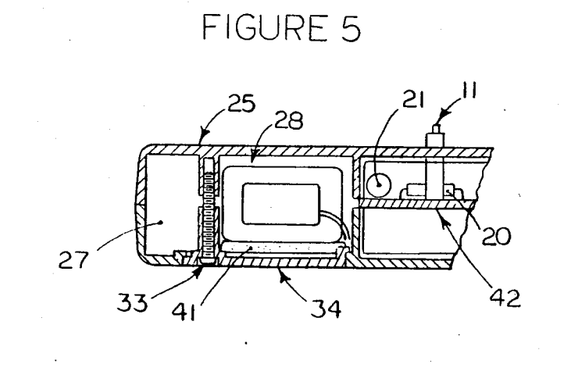

FIG. 3 and FIG. 5 illustrate the method of interconnecting modular jack 27, (and eight conductors 29), to the main component body assembled on P.C. (printed circuit) board 42. The nine volt battery 28 is also shown and connected to the aforementioned P.C. board by a two conductor snap device 40 well known by those skilled in the art. FIG. 5 illustrates foam pad 41 used to cushion nine volt battery 28 after enclosure 26 is assembled.

Figure 6:
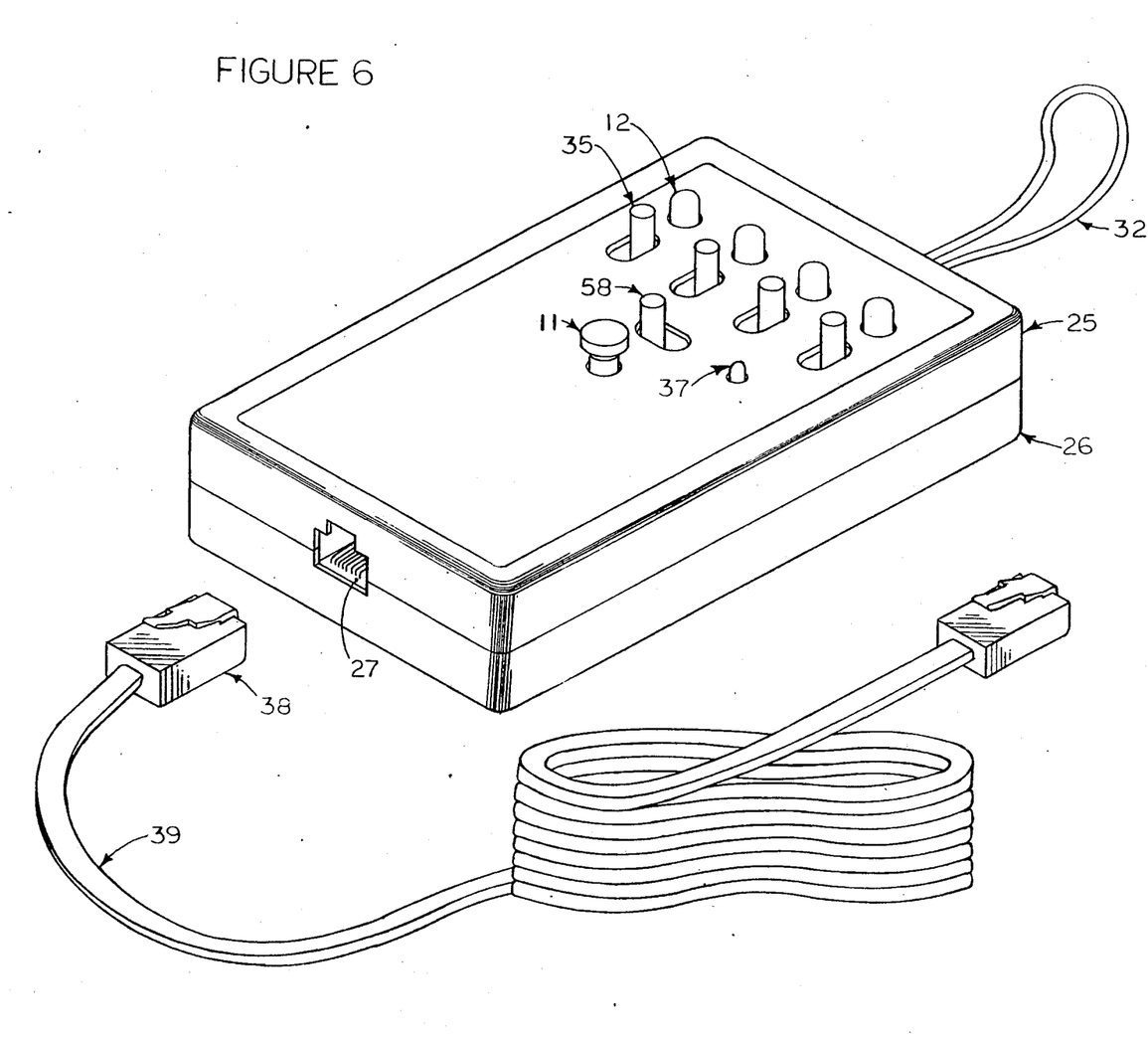
FIG. 6 is the completed assembled pictorial of the preferred embodiment with the recommended connecting means.

FIG. 6 illustrates the inventors recommended connecting cord 39 with a press formed eight position plug 38. Cord assembly 39 allows the invention to be connected to a sixty-six type block arrangement 47 as shown in FIG. 7. Connecting means 51 is an industry approved sixty-six block adapter which will accomodate one end of connecting cord 39, the other end being plugged into test device 45. Hence, voltage status may be verified between C.P.E. equipment 43 and customer phone 49. Said voltage status resides within interconnect cabling 44, 46, 48, and 50. However, during said verification procedure, one or more of four pairs may appear open. Said open conductors can be verified as illustrated in FIG. 9. That is, test device 45 can be connected to sixty-six block 47 by connecting means 51 and warble tone can then be sent over any pair or pairs residing in cable 46. Said tone may then be monitored at an adjacent sixtysix type block, (as illustrated in FIG. 9), by connecting a standard Lineperson's Test Phone 56 and 57.

Figure 11:
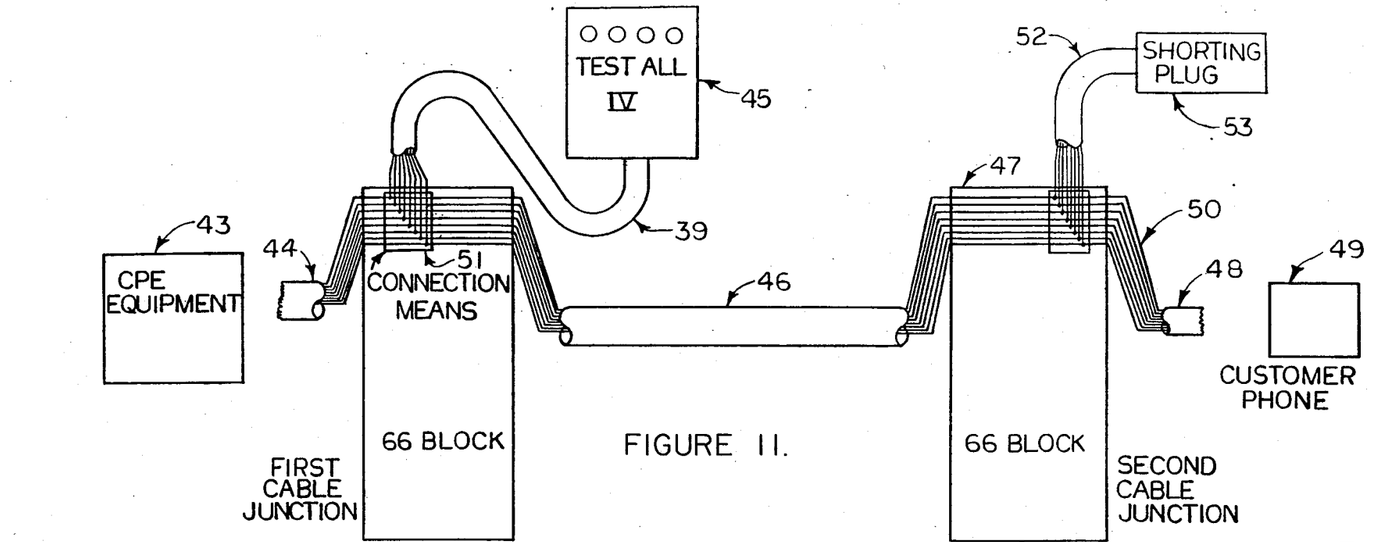
FIG. 11 through FIG. 14 are pictorial representations of the embodiment when operating in the "continuity" mode to test the continuity of cable pairs by the use of a shorting plug or an LED equipped shorting plug.
Figure 13:
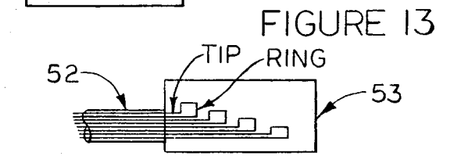
Figure 14:
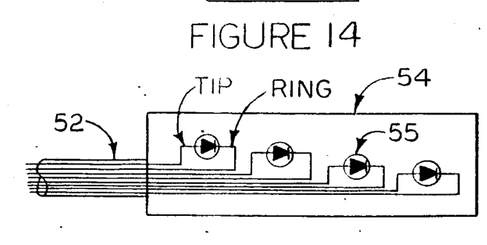

Under new installation conditions, FIG. 11 illustrates a suggested method of creating an effective continuity test condition. Test device 45 is connected to a sixty-six type block as in FIG. 7 and FIG. 9. Said test device is operated in the "cont" mode as illustrated in FIG. 11. A short circuit on any of four pairs, conducted through either shorting plug 53 or the LED shorting plug 54 illustrated in FIG. 14, illuminates the associated pair LED in aforementioned test device 45. FIG. 13 and FIG. 14 are pictorial views of the circuit structure of the shorting plug and LED shorting plug respectively.

What is claimed is:

1. A unitary, compact and hand held four pair test device for use on communication interconnect cabling or wire configurations, said cable and said wire configurations being double ended, terminated or unterminated, either working or non-working, and for use on the communication systems which are connected thereby to test four individual ring and tip conductor pairs either individually or simultaneously for line status, continuity and polarity, comprising:
   (a) four line pair paths, each said line pair path establishing a current path between one of said ring and tip conductor pairs through first switching means in series with a tri-state, bi-directional LED, and a first load resistor;
   (b) four tone paths, each said tone path establishing a current path between one of said ring and tip conductor pairs through said first switching means, said tone paths further establishing a current path through series capacitance and resistance means, a tone generator source, second switching means, and a battery; and
   (c) four continuity paths, each said continuity path establishing a current path between one of said ring and tip conductor pairs through said first switching means in series with said bi-directional LED, an isolation diode, and a second load resistor, said continuity paths further establishing a current path through said second switching means and said battery, whereby said second switching means cooperates with each said first switching means to provide a line pair path, tone path or continuity path to each said ring and tip conductor pair, either individually or simultaneously, and whereby communication system voltage across said ring and tip conductor pairs activates said bi-directional LEDs in said line pair paths, said tone paths provide an unattenuated tone signal through said ring and tip conductor pairs either individually or simultaneously, and terminated ring and tip conductor pairs activate said bi-directional, LEDs in said continuity paths.

2. The four pair test set according to claim 1, having connecting means of the standard type, eight conductor, modular connecting jack commonly found in communications instruments.

3. The four pair test device according to claim 1, wherein said tone generator source is a self-contained, integrated circuit package.

4. The four pair test device according to claim 1, wherein each said line pair path bi-directional LED has the following illumination states:
   (a) non-illuminated if no voltage potential exists across said ring and tip conductor pair;
   (b) illuminated green if said ring and tip conductor pair has a positive potential on the tip conductor and a negative potential on the ring conductor;
   (c) illuminated red if said ring and tip conductor pair has a positive potential on the ring conductor and negative potential on the tip conductor; and
   (d) illuminated amber if A.C. potential exists across said ring and tip conductor pair.

5. The four pair test device according to claim 1, wherein each said continuity path bi-directional LED has the following illumination states:
   (a) non-illuminated if said ring and tip conductor pair is open;
   (b) illuminated green if said ring and tip conductor pair is shorted;
   (c) illuminated green if said ring and tip conductor pair is transposed or shorted with any of the other said ring and tip conductor pairs; and
   (d) illuminated green if said ring and tip conductor pair are crossed with any other of said ring and tip conductor pairs, said cross thereby causing the illumination of one or more of said LEDs.

6. The four pair test device according to claim 1, further including a means for connecting said device to any pair of conductors which are part of an external connection to a communications system, whereby said device tests said pair of conductor's electrical status.

7. A four pair test device according to claim 1, wherein each said continuity path includes second tri-state, bi-directional LED constructed and arranged for connection across said ring and tip conductor pair at the opposite end of a cable from the remaining elements of said continuity paths and establishing a current path between said ring and tip conductor pair, said second bi-directional LED having the following illumination states: (a) illuminated green if polarity is correct, (b) illuminated red if polarity is incorrect, and (c) non-illuminated if said ring and tip conductor pair is open.

8. The four pair test device according to claim 1, wherein said tone paths further establish a current path through third resistance means in series with third LED means, said third LED means being illuminated.

9. A four pair test device according to claim 7, wherein said second tri-state, bi-directional LEDs are connected to said ring and tip conductor pairs by a standard type, eight conductor modular connecting jack.

10. The four pair test device according to claim 1, further comprising a third switching means connected and arranged to test 1A Type Key System's Control functions.

11. A four pair test device according to claim 1, wherein said first and said second switching means are mechanical.

12. A unitary, compact and hand held four pair test device for use on communication interconnect cabling, or wire configurations, said cable and said wire configurations being double ended, terminated or unterminated, either working or non-working, and for use on the communication systems which are connected thereby to test four individual ring and tip conductor pair either individually or simultaneously for line status, continuity and polarity, comprising:
  (a) four line pair paths, each said line pair path establishing a current path between one of said ring and tip conductor pairs through first switching means in series with a tri-state, bi-directional LED, and a first load resistor, said bi-directional LED having the following illumination states:
    i. non-illuminated if no voltage potential exists across said ring and tip conductor pair;
    ii. illuminated green if said ring and tip conductor pair has a positive potential on the tip conductor and a negative potential on the ring conductor;
    iii. illuminated red if said ring and tip conductor pair has a positive potential on the ring conductor and a negative potential on the tip conductor; and
    iv. illuminated amber if A.C. potential exists across said ring and tip conductor pair;
  (b) four tone paths, each said tone path establishing a current path between one of said ring and tip conductor pairs through said first switching means, said tone paths further establishing a current path through series capacitance and resistance means, a tone generator source, second switching means, and a battery; and
  (c) four continuity paths, each said continuity path establishing a current path between one of said ring and tip conductor pairs through said first switching means in series with said bi-directional LED, an isolation diode, and a second load resistor, said continuity paths further establishing a current path through said second switching means and said battery, whereby said second switching means cooperates with each said first switching means to provide a line pair path, tone path or continuity path to each said ring and tip conductor pair, either individually or simultaneously, and whereby communication system voltage across said ring and tip conductor pairs activates said bi-directional LEDs in said line pair paths, said tone paths provide an unattenuated tone signal through said ring and tip conductor pairs either individually or simultaneously, and terminated ring and tip conductor pairs activate said bi-directional, LEDs in said continuity paths.

* * * * *